US006425028B1

(12) United States Patent
Fosmo

(10) Patent No.: US 6,425,028 B1
(45) Date of Patent: *Jul. 23, 2002

(54) METHOD AND APPARATUS FOR ACTIVATING A POWER INTERLOCK SYSTEM AND AUTOMATICALLY DISABLING A POWER SUPPLY IN A COMPUTER HAVING PCI SLOTS

(75) Inventor: Jeffrey Robert Fosmo, Plainview, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,987

(22) Filed: Feb. 8, 2000

Related U.S. Application Data

(62) Division of application No. 08/971,662, filed on Nov. 17, 1997.

(51) Int. Cl.[7] ............................................. G06F 13/00

(52) U.S. Cl. .................. 710/103; 710/102; 713/330; 713/340; 713/324

(58) Field of Search ................................. 710/101–103; 713/310, 323, 324, 330, 340; 361/58, 18

(56) References Cited

U.S. PATENT DOCUMENTS

| | | | | | |
|---|---|---|---|---|---|
| 5,517,623 | A | * | 5/1996 | Farrell et al. | 395/281 |
| 5,604,871 | A | * | 2/1997 | Pecone | 395/281 |
| 5,636,347 | A | * | 6/1997 | Muchnick et al. | 395/283 |
| 5,649,121 | A | * | 7/1997 | Budman et al. | 395/281 |
| 5,712,754 | A | * | 1/1998 | Sides et al. | 361/58 |
| 5,740,378 | A | * | 4/1998 | Rehl et al. | 395/283 |
| 5,754,797 | A | * | 5/1998 | Takahashi | 395/283 |
| 5,805,904 | A | * | 9/1998 | Jung | 395/750.01 |
| 5,943,482 | A | * | 8/1999 | Culley et al. | 710/103 |
| 6,170,029 | B1 | * | 1/2000 | Kelley et al. | 710/103 |
| 6,058,444 | A | * | 5/2000 | Johnson | 710/102 |
| 6,108,731 | A | * | 8/2000 | Suzuki et al. | 710/102 |

* cited by examiner

*Primary Examiner*—Robert Beausoleil
*Assistant Examiner*—Raymond N Phan
(74) *Attorney, Agent, or Firm*—Schmeiser, Olsen & Watts; Steven W. Roth

(57) ABSTRACT

According to the present invention, an apparatus and method for providing a power interlock system for computers with PCI slots is disclosed. An internal power lock apparatus according to a preferred embodiment of the present invention has a PCI detection circuit which senses the presence or absence of a PCI card or access port cover for each and every PCI slot in the computer. If any of the PCI slots do not have a PCI card installed and do not have an access cover to prevent access to the open slot, the PCI detection circuit activates the power interlock system and automatically disables the power supply.

5 Claims, 3 Drawing Sheets

METHOD AND APPARATUS FOR ACTIVATING A POWER INTERLOCK SYSTEM AND AUTOMATICALLY DISABLING A POWER SUPPLY IN A COMPUTER HAVING PCI SLOTS

This application is a divisional of U.S. patent application Ser. No. 08/971,662, filed on Nov. 17, 1997 by Jeffrey R. Fosmo, which application is incorporated by reference herein.

BACKGROUND OF THE INVENTION

1. Technical Field

This invention generally relates to power supply components for computer systems. More specifically, this invention relates to power interlock systems.

2. Background Art

The development of the EDVAC computer system of 1948 is often cited as the beginning of the computer era. Since that time, computer systems have evolved into extremely sophisticated devices, and computer systems may be found in many different settings. Modern computer systems vary in their design and architecture, with many different models available to achieve the desired combination of speed, power and efficiency for any given computing environment.

In addition, most computer systems are used for a wide variety of tasks and, therefore, need to be flexible and versatile enough to change with the varying requirements of the computer user over time. For example, as the number of computer users on a given computer network increases, additional network components such as network cards and cables/adapters may need to be added. Further, as organizational changes occur, the type and quantity of data being stored and processed may also change, requiring new or additional equipment such as external secondary storage devices.

To facilitate increased versatility for a wide range of users, many modern computers, such as the IBM AS/400, use expansion slots known as Peripheral Component Interconnect (PCI) slots. PCI slots provide an industry standard expansion card/slot interface which allows different types of PCI Input Output Adaptors (PCIIOA cards or "PCI cards") to be quickly and easily added to an existing computer system. These PCI cards can be configured with various hardware/software components and used to expand or add various features or functional capabilities to a computer (i.e., expanded memory, multi-processor capabilities, etc.). In addition, PCI cards can also be configured with adapters for various connecting cables which allow a computer to interface with a host of external peripheral devices, thereby further increasing the functionality and/or versatility of the computer system.

The types of devices which may be connected to a given computer system through the use of a PCI card/slot interface are practically limitless. Several of the most common devices which are typically connected via a PCI card/slot interface to a computer include: hard disk drive controllers; network interface cards, such as token ring adaptors, Ethernet adaptors, etc.; COM adaptors for modems, facsimile machines, etc.; and Small Computer System Interface (SCSI) Controllers for adding tape drives, CD ROM drives, etc.

To provide a wide variety of expansion capabilities, most computers will have a series of PCI slots built into the computer's chassis or frame and which are each sized and positioned to receive a PCI card. Since the PCI slots provide direct access to the internal power system of the computer, the access openings to any empty PCI slots will typically be covered by a metal PCI slot access cover or "blank" to prevent foreign objects from entering the computer's frame or chassis. To install a PCI card, the PCI slot access cover is removed from the frame and the PCI card is inserted through an opening in the chassis/frame which provides access to the PCI slot associated with that access cover. Once inserted into a PCI slot, the PCI card is typically secured in place with one or more screws. After installation, the PCI card is typically powered by the internal power system of the computer and the PCI card can communicate directly with the computer.

Since the PCI slots have connectors that provide access to the power system of the computer, inadvertent contact with an empty yet "hot" PCI slot may result in serious injury or, in the case of computers with larger power supplies, death from electrocution. In most smaller personal computers, the risk of injury is fairly remote because the power supplies are fairly low power. However with larger computer systems containing high capacity power supplies, the potential for injury is relatively significant, because the amount of power required to operate larger computer systems is much greater than most personal computers.

As a result of this potential electrocution hazard, Underwriters Laboratories (U.L.), a certification group for items such as computer systems power supplies, requires that some type of safety system be installed on larger computer systems to prevent inadvertent access to the computer's power supply through an empty PCI slot. The U.L. standards for these protective measures are outlined in U.L. standard 1950, $3^{rd}$ edition, clause 2.8.

One method that has been adopted by several computer manufacturers in an effort to comply with the U.L. requirement is a power interlock system which controls the computer system's power supply. For example, on the IBM AS/400 9406 model 620, an single external plastic cage is placed over the access covers for all of the PCI slots. The plastic cage is large enough to cover all of the PCI slots on the AS/400, whether they are full or empty, and extends a slight distance out from the back of the computer frame or chassis. The cage also has a number of small holes which allow air flow but which are small enough to prevent access to the inside of the cage and, by extension, into any empty PCI slots. One end of the cage includes a single electrical connector, which, when the cage is properly installed, connects with an adaptor built into the frame of the computer. If the connector and the adaptor are not connected (i.e., the cage is removed to access the PCI slots), a power interlock system is activated and the computer system will not "power up." Alternatively, is the computer system is already powered up when the cage is removed, the combination of the cage/interlock system immediately shuts the power supply off. While very effective from a safety perspective, this is a relatively inefficient, time consuming, and unnecessary process for several reasons.

For example, it is often desirable to add or remove cables from network PCI cards to alter a network configuration. While the act of adding a cable is simple enough, the cage not only prevents access to the PCI cards, but also to the cables connected to the PCI cards. This means it is necessary to power down the entire computer system for even the most minor re-configurations. Typically, a user will shut the system down, remove the protective cage, add, remove, or otherwise reconfigure the desired cables, reinstall the protective cage and then the computer system back on line. This also means that a single bad cable can necessitate bringing the entire system down in order to replace the single defective cable. Not only is this process somewhat inconvenient, it can significantly reduce productivity since all of the users connected to the system have to wait for the system to be powered up before they can access the system and continue working.

Without a less intrusive mechanism for disabling the power supply, many computer systems will continue to be less convenient to use and certain modifications or enhancements may not be adopted due the undesirable operational inefficiencies which are associated with the present electrocution hazard preventive safety measures.

DISCLOSURE OF INVENTION

According to the present invention, an apparatus and method for providing a power interlock system for computers with PCI slots is disclosed. An internal power lock apparatus according to a preferred embodiment of the present invention has a PCI detection circuit which electrically senses the presence or absence of a PCI card or access port cover for each and every PCI slot in the computer. If any of the PCI slots do not have a PCI card installed and do not have an access cover to prevent access to the open slot, the PCI detection circuit activates the power interlock system and automatically disables the power supply.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

An internal power lock apparatus according to a preferred embodiment of the present invention has a PCI detection circuit which senses the presence or absence of a PCI card or access port cover for each and every PCI slot in the computer. If any of the PCI slots do not have a PCI card installed and do not have an access cover to prevent access to the open slot, the PCI detection circuit activates the power interlock system and automatically disables the power supply.

Detailed Description

A preferred embodiment of the present invention utilizes a PCI detection circuit to determine whether or not all of the PCI slots located in the chassis/frame of the computer are occupied with PCI cards or covered by appropriate access covers. The PCI detection circuit may take many different forms, the only requirements being that the PCI detection circuit be capable of monitoring the PCI slots and interfacing with the power interlock system for the computer.

Figure 1:
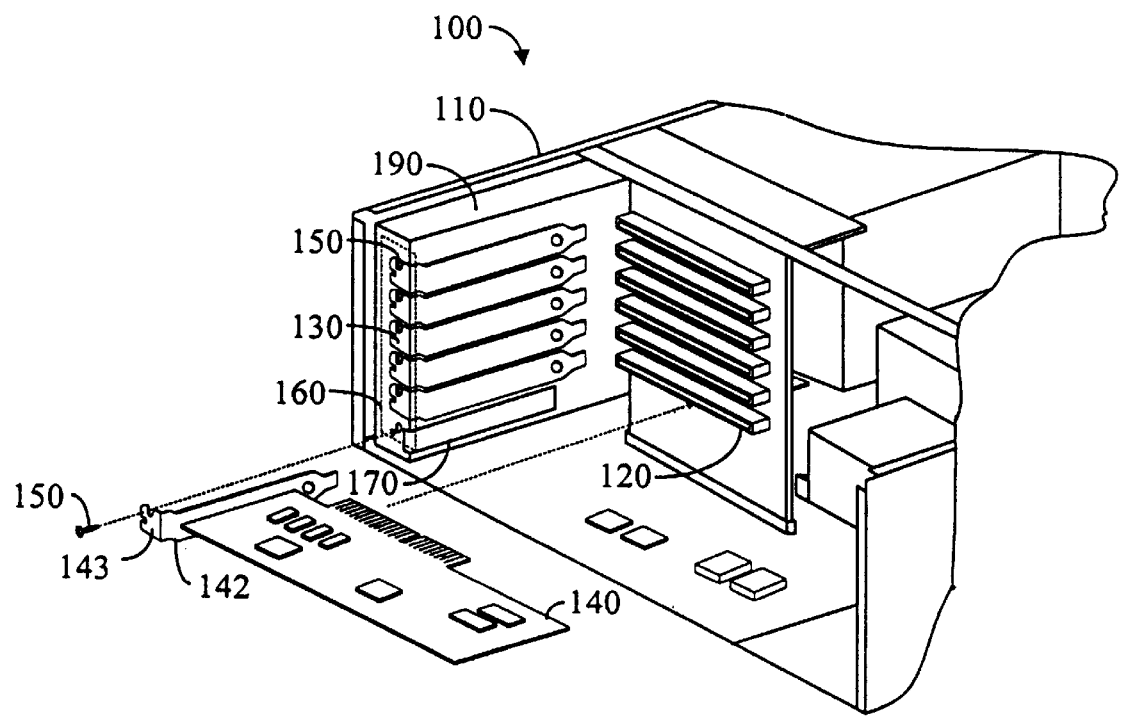
FIG. 1 is a cut-away perspective view of a generalized PCI card/slot interface located inside a computer chassis/frame.

Referring now to FIG. 1, an interior portion of a computer 100 is shown. Computer 100 includes: chassis/frame 110; PCI slots 120; PCI slot access covers 130; and one or more PCI cards 140. PCI cards 140 and PCI slot access covers 130 are securely held in place by fasteners 150. For most typical computer systems, chassis/frame 110 and fasteners 150 are fabricated from a conductive metal material.

PCI detection circuit 160 is preferably located in the vicinity of chassis/frame 110 where fasteners 150 are inserted into chassis/frame 110. PCI detection circuit 160 will typically be placed around the perimeter or along the edge of PCI access ports 170. PCI detection circuit may be implemented in many different ways, two of which are explained below. In general, PCI detection circuit 160 monitors chassis/frame 110 for the presence of PCI card mounting brackets 142 and access covers 130. PCI detection circuit 160 is electrically connected to the existing power interlock system (not shown) for computer 100.

If all PCI access ports 170 have a PCI card mounting bracket 142 or an access cover 130 correctly installed in place, the power supply (not shown) for computer 100 is fully operational. However, if one or more access ports 170 does not have a PCI card mounting bracket 142 or an access cover 130 in place to prevent access to PCI slots 120, the power supply for computer 100 is disabled by the power interlock system.

As shown in FIG. 1, each PCI card 140 is attached to a PCI card mounting bracket 142 and PCI cards 140 are installed into PCI slots 120. PCI cards 140 and PCI slot access covers 130 are attached to a mounting location 190. Mounting location 190 has a series of pre-drilled holes to accommodate fasteners 150 and is typically an integral part of chassis/frame 110. Further, mounting location 190 provides a secure structure for attaching PCI cards 140 and PCI slot access covers 130. Note that each PCI card 140 and each access cover 130 has a mounting face 143. Mounting faces 143 each have a hole or a slot which can accommodate a fastener 150.

PCI access ports 170 are openings in chassis/frame 110 which provide access to the various input/output connectors (not shown) which are typically located on PCI card mounting bracket 142. When PCI cards 140 are installed in place, the input/output connectors are accessible from the exterior of computer 100 through the openings created by access ports 170. This allows various communication and network cables to be connected to PCI cards 140.

Figure 2:
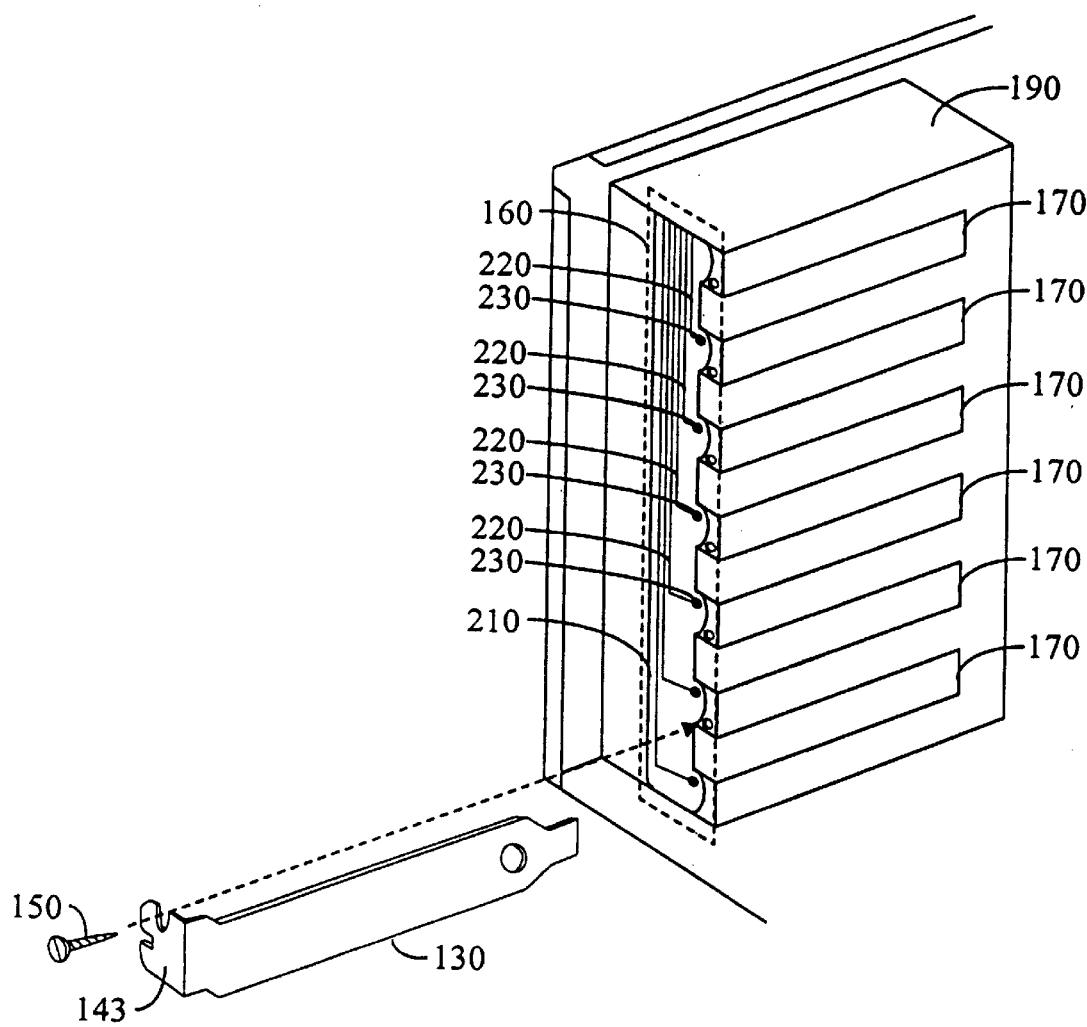
FIG. 2 is a perspective view of a PCI detection circuit according to a preferred embodiment of the present invention.

Referring now to FIG. 2, in one preferred embodiment of PCI detection circuit 160, a strip of flex cable 210 is mounted next to PCI access ports 170, inside chassis/frame 110 where access covers 130 or the PCI cards 140 are mounted into chassis/frame 110. Flat flex cable 210 is a piece of cable with a series of conductive wires 220 contained within a relatively flat insulative coating. As is known to those skilled in the art, many types of cable could be used to implement flat flex cable 220. For example, the commonly known "flat flex cable" consists of etched metal foil circuitry insulated with sheet polyamide or mylar dielectric bonded in layers with acrylic adhesive. While flat flex cable is acceptable, any other suitable cable will suffice. In addition, an exposed conductive contact pad 230 is provided on the surface of flat flex cable 210 in close proximity to each PCI access port 170. Each conductive contact pad 230 is electrically connected to a separate conductive wire 220 and all conductive wires are connected to a monitoring circuit (not shown). The monitoring circuit interfaces with and activates the internal power interlock system if a power supply exception is detected (i.e. no access cover or PCI card installed).

Whenever an access cover 130 or PCI card mounting bracket 142 is installed, mounting face 143 will make contact with a conductive contact pad 230. By providing this arrangement, each conductive contact pad 230 can detect whether there is an access cover 130 or PCI card mounting bracket 142 installed in the PCI access port 170 adjacent to each respective conductive contact pad 230. Since flat flex cable 210 is connected to and interfaces with the power interlock mechanism of the power supply for computer system 100, the power supply can be selectively disabled whenever there is an open or exposed access port 170.

Figure 3:
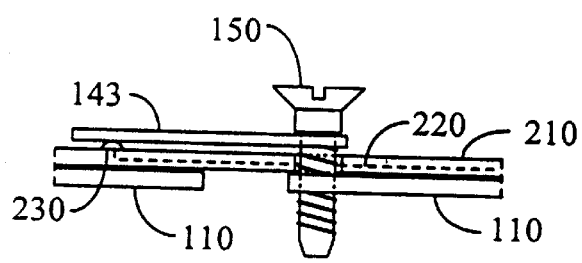
FIG. 3 is a side view of a portion of the PCI detection circuit of FIG. 2.

Referring now to FIG. 3, the use of conductive contact pads 230 in PCI detection circuit 160 of FIG. 2 is further illustrated. As shown in FIG. 3, conductive contact pads 230 are small protrusions on the surface of flat flex cable 210 and are electrically connected to a conductive wire 220. Each PCI access port 170 has a conductive contact pad 230 associated with it and each conductive contact pad 230 is part of a ground detection circuit. PCI mounting brackets 142 and PCI access port covers 130 are grounded to chassis/frame 110 by fasteners 150. If any conductive pad 230 is not grounded, the power interlock system of computer 100 is activated. Therefore, when every PCI access port 170 has a PCI card 140 or access cover 130 correctly installed, each respective mounting face 143 will contact a conductive pad 230 and the power supply for computer 100 (not shown) is fully operational. If, however, an access cover 130 or PCI card bracket 142 is not in place to around a circuit, the power supply for computer 100 is disabled by the power interlock system.

Figure 4:
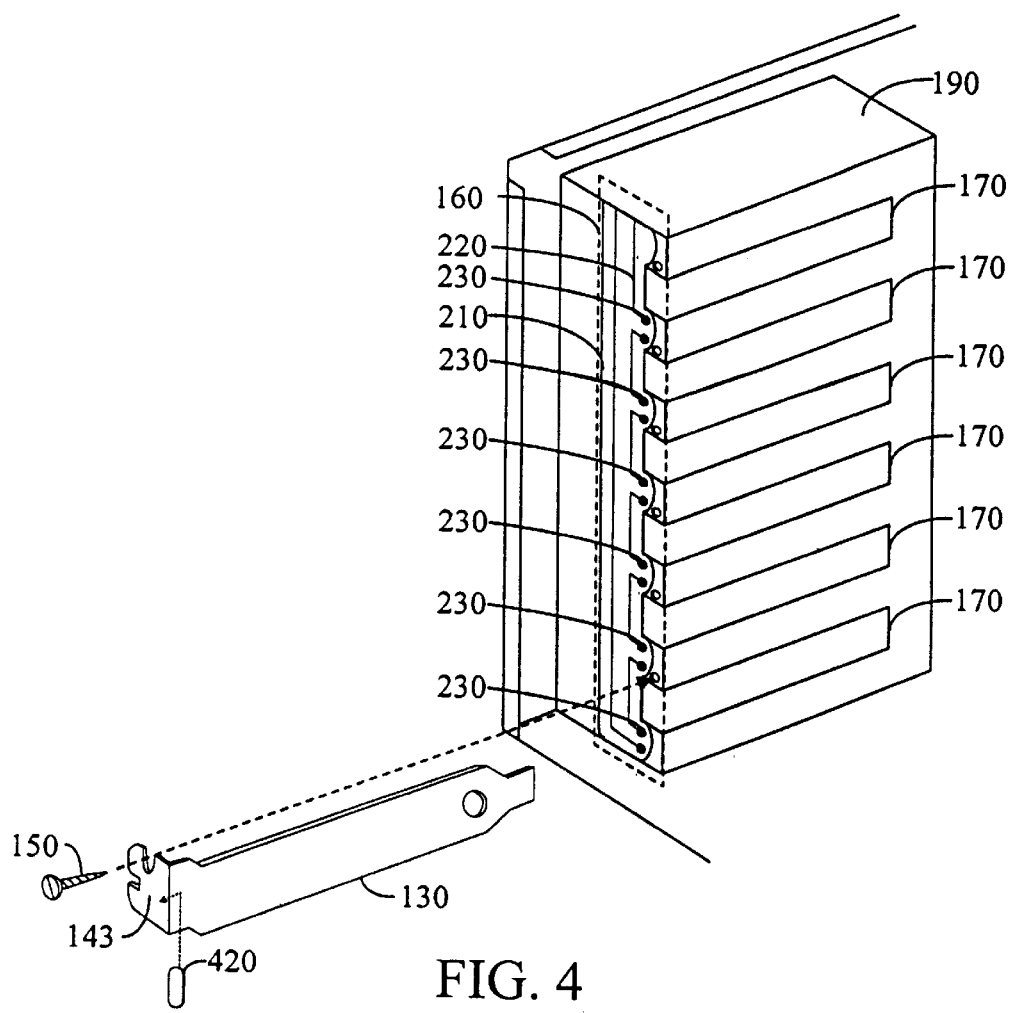
FIG. 4 is a perspective view of a PCI detection circuit according to an alternative preferred embodiment of the present invention.

Referring now to FIG. 4, the most preferred embodiment of PCI detection circuit 160 is illustrated. In this embodiment, PCI detection circuit 160 is a continuity circuit. As shown in FIG. 4 and as explained above, PCI detection circuit 160 includes a strip of flat flex cable 210 mounted next to PCI access ports 170 where access covers 130 or PCI cards 140 are mounted into chassis/frame 110. As before, a fastener 150 is inserted through a hole or slot in mounting face 143, and then fastener 150 is tightened into frame 110, thereby securing PCI card 140 or access cover 130 into place.

In this embodiment, a pair of conductive contact pads 230 is provided on the surface of flat flex cable 210 in close proximity to each PCI access port 170. Each pair of conductive contact pads 230 are electrically separated by a small gap. Further, each conductive contact pad 230 is electrically connected to either the adjacent pair of conductive contact pads 230 or back to the power interlock circuit (not shown).

Whenever an access cover 130 or PCI card mounting bracket 142 is installed, a small conductive continuity adapter 420 mounted on mounting face 143 will make contact with conductive contact pads 230. Conductive continuity adapter 420 bridges the gap that exists between each pair of conductive contact pads 230. Each conductive contact pad 230 within the pair are electrically separated from its mate until access covers 130 or PCI card mounting brackets 142 are installed, thus electrically connecting the two pads together to form the continuous circuit for that particular slot.

By providing this arrangement, each pair of conductive contact pads 230 are part of a single continuity circuit which can detect whether there are access covers 130 or PCI card mounting brackets 142 in the PCI access port 170 adjacent to each respective pair of conductive contact pads 230. Since flat flex cable 210 is connected to and interfaces with the power interlock mechanism of the power supply for computer system 100, the power interlock mechanism can be selectively disabled by simply checking the electrical continuity in PCI detection circuit 160. If there is no electrical continuity, the power supply can be disabled. In this manner, whenever there is an open or exposed access port 170, the interlock system will be enabled and the computer will not power up.

It should be noted that many other devices, such as pressure-sensitive micro-switches, could be used to implement a PCI detection circuit 160 in accordance with a preferred embodiment of the present invention. In addition, a circuit board could be developed with the requisite circuitry to detect the presence or absence of access covers 130 or PCI card mounting brackets 142. Flat flex cable 210 is currently the most preferred choice because it is very flat and takes up very little room along the surface of frame 110.

Figure 5:
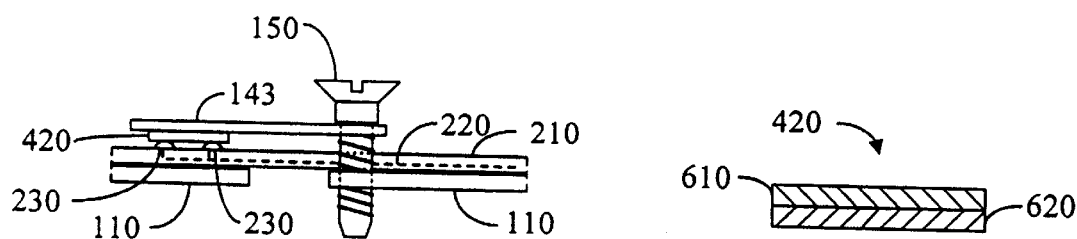
FIG. 5 is a side view of a portion of the PCI detection circuit of FIG. 4.

Referring now to FIG. 5, the use of continuity adapter 420 in PCI detection circuit 160 of FIG. 5 is further illustrated. As shown in FIG. 5, continuity adapter 420 bridges the gap between each set of contact pads 230 associated with each PCI access port 170. Continuity adapter 420 acts as a circuit element in PCI detection circuit 160 and provides a path for electrical current to flow through PCI detection circuit 160. Each access cover 130 and each PCI card bracket 142 has a continuity adapter 420 associated with it. Therefore, when every access port has a PCI card 140 or an access cover 130 in place, PCI detection circuit 160 is complete and the power supply for computer 100 (not shown) is fully operational. If, however, a continuity adapter 420 is not in place to complete the circuit, the power supply for computer 100 is disabled by the power interlock system.

Figure 6:
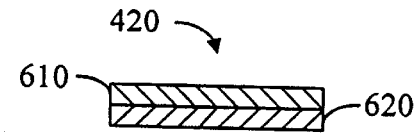
FIG. 6 is a side view of a portion of the continuity adapter of the PCI detection circuit of FIGS. 4 and 5.

Referring now to FIG. 6, continuity adapter 420 according to a preferred embodiment of the present invention includes an insulative layer 610 and a conductive layer 620. Insulative layer 610 electrically isolates access covers 130 (or PCI card bracket 142 in the case of an installed PCI card 140) from conductive layer 620.

While the invention has been particularly shown and described with reference to preferred embodiments thereof, it will be understood by those skilled in the art that various changes in form and details may be made therein without departing from the spirit and scope of the invention.

What is claimed is:

1. A method for providing a power interlock for a computer system power supply, the method comprising the steps of:

monitoring at least one PCI slot in the computer system with a PCI detection circuit;

disabling the power supply for the computer system by activating the power interlock if a power supply exception is detected by a PCI detection circuit, said power supply exception indicating that neither a PCI mounting bracket nor an access cover are correctly installed for said at least one PCI slot.

2. The method of claim 1 wherein the step of monitoring the at least one PCI slot comprises the step of monitoring a flat flex cable located near the at least one PCI slot.

3. A power interlock apparatus, the apparatus comprising:
a computer with a frame;
a power supply in the computer frame, the power supply providing power for the computer;
a plurality of PCI slots in the computer frame;
at least one of the PCI slots containing a PCI card;
at least one of the PCI slots not containing a PCI card;
a PCI detection circuit coupled to the computer frame, the PCI detection circuit comprising a flat flex cable with a plurality of conductors and a pair of contact pads proximate to each of the at least one PCI slot such that an electrical connection between the pair of contact pads can be established by a mounting face mounted in the frame, the PCI detection circuit disabling the power supply for the computer if a power supply exception exists.

4. The apparatus of claim 3, wherein each of the pairs of contact pads are positioned such that an electrical connection between each of the pairs of contact pads can be established by mounting a mounting face in the frame over each of the pairs of contact pads, thereby creating a continuous electrical circuit.

5. The apparatus of claim 4 wherein the electrical connection is established by a conductive pad located on the mounting face.

* * * * *